Figure 1:
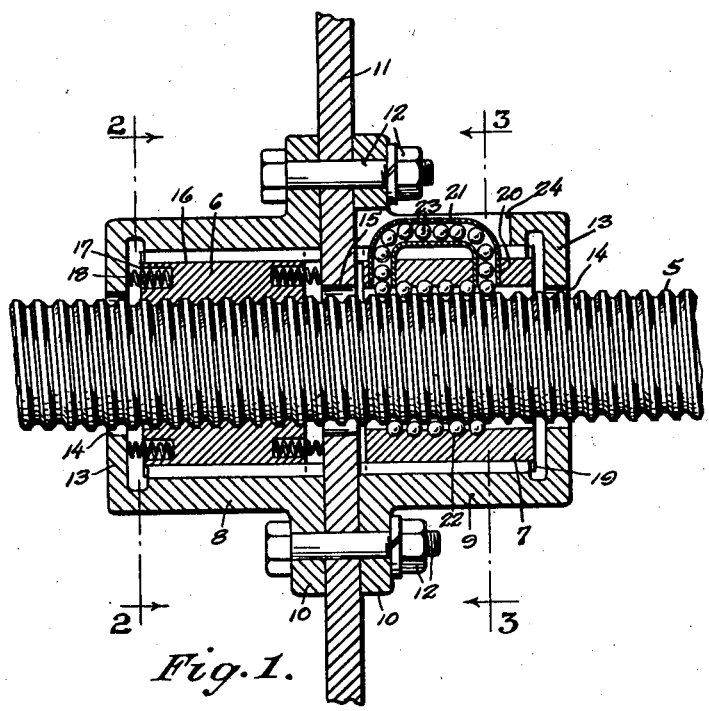

Aug. 17, 1948.    R. E. THOMPSON    2,447,439
SELF-LOCKING SCREW
Filed Dec. 12, 1945

INVENTOR.
Roy E. Thompson
ATTORNEY.

Patented Aug. 17, 1948

2,447,439

UNITED STATES PATENT OFFICE 2,447,439

SELF-LOCKING SCREW

Roy E. Thompson, Seattle, Wash.

Application December 12, 1945, Serial No. 634,494

8 Claims. (Cl. 74—424.8)

This invention relates to certain new and useful improvements in self-locking screws.

It is, of course, well known that screws are employed for transmitting force or motion in various mechanical arts and such screws possess threads of different designs or characteristics, common types of such threads being known in the art as of V-shape, square and of the acme type. It is also known in the art that comparatively low efficiency results from the use of screws of the foregoing type, but with such low efficiency there is present the added advantage of a self-locking feature of a nut or like body on the screw at any point in the operation of the screw for the transmission of force or motion.

Recent developments have resulted in the production of high efficiency screws and one of such developments embodies the provision of bearing balls operating in grooves in the bore of a nut and extending into the valleys of the threads of the screw, such ball bearings carrying the load placed on the screw and greatly increasing the efficiency of such an assembly. However, with the use of such power transmitting means of increased efficiency, there is the loss of inherent self-locking feature embodied in the usual nut and screw combination and in many instances the self-locking feature of the nut on the screw is of considerable importance, and to obtain maximum results it is essential to have a nut and screw combination of high efficiency and one that possesses the self-locking feature.

It is therefore the primary object of the present invention to provide a highly efficient self-locking screw wherein two nuts are associated with a screw and work in combination or association with each other to produce the high efficiency in work and the self-locking feature.

A further object of the invention is to provide a high efficiency self-locking screw having two nuts of different constructional characteristics and functions working on a screw with one of the nuts having ball bearings forming a thread connection between said nut and screw, the other nut including tensionable devices for the pickup of the self-locking feature during initial operation of the screw while excess load placed on the screw beyond the power of the tensioned nut being taken up by the ball bearing nut, this arrangement or general combination operating without any appreciable loss of efficiency and retaining the self-locking characteristic.

With the above and other objects in view that will become apparent as the nature of the invention is better understood, the same consists in the novel form, combination and arrangement of parts hereinafter more fully described, shown in the accompanying drawing and claimed.

Figure 2:
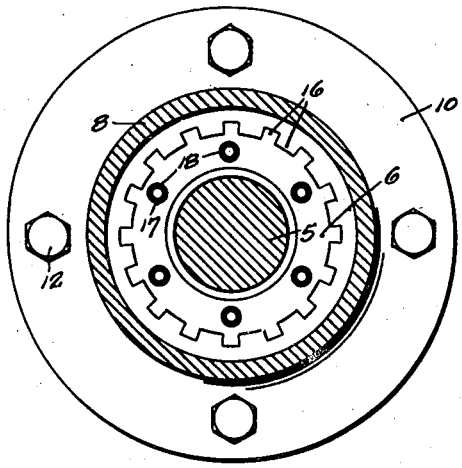
Figure 3:
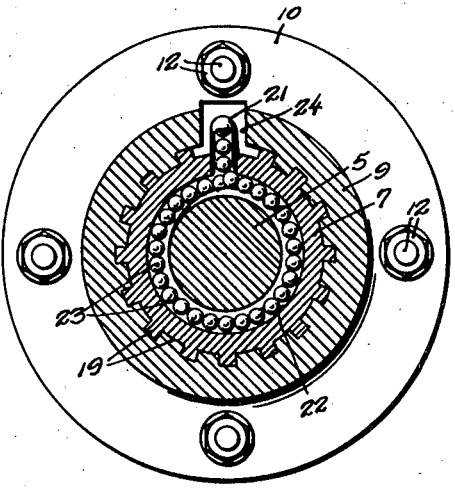

In the drawing:

Figure 1 is a fragmentary vertical longitudinal sectional view of a high efficiency self-locking screw constructed in accordance with the present invention, showing two nuts of different characteristics working on the screw, Figure 2 is a vertical cross-sectional view taken on line 2—2 of Figure 1, showing the tensioned nut in end elevation, and Figure 3 is a vertical cross-sectional view taken on line 3—3 of Figure 1, showing the ball connection between one of the nuts and the screw.

The high efficiency self-locking screw of the present invention embodies broadly a screw with two different types of nuts working thereon the one acting to produce high efficiency in operation and the other serving a self-locking function. As illustrated on the drawing, the reference character 5 designates a screw for transmitting endwise force or rotary motion but which is itself responsively loaded by an axial thrust, and working upon this screw and occupying spaced positions are a tensioned nut 6 and a ball bearing nut 7. The threads of the screw may be any one of various known types as, for example, square, acme, or V. The nuts 6 and 7 are housed within a casing structure through which the screw 5 extends and the casing structure preferably is of two-part formation, comprising cylindrical sections 8 and 9 with the adjacent edges of said sections being outwardly flanged as at 10 for abutting contact with a center plate 11 to which said flanges are connected by means of bolt and nut combinations 12. The outer end wall 13 of each of the casing sections 8 and 9 is provided with a central opening 14 for the passage of the screw 5 and the center plate 11 is provided with a similar opening 15 through which said screw extends, all as shown in Figure 1 of the drawing.

The tensioned nut 6 that forms the self-locking feature of the combination is directly threaded onto the screw 5 and has a peripheral longitudinally splined connection 16 with the inner face of the cylindrical casing section 8, and to provide for the tensioning of said nut 6 and as illustrated in Figure 1, there is provided in each of the opposite faces a series of circumferentially spaced sockets or recesses 17 for the mounting of coil springs 18. These springs bear at one end against the floor of the related socket and at the other end against the flange 13 or the center plate 11, as the case may be. It will be observed that the length of the nut 6 is less than the span between the flange and the plate, allowing a limited floating action of the nut, the splined connection with the casing 8 acting, however, to hold the nut against rotation. This floating movement is, perforce, opposed by the springs 18.

The ball bearing nut 7 likewise has a peripherally splined connection 19 with the inner face of its cylindrical casing 9 and also is allowed limited endwise movement unrestrained by any spring resistance, the permitted travel being, however, less in the instance of the ball-bearing nut than for the tensioned nut. As shown in Figures 1 and 2, the nut 7 is formed with a pair of longitudinally spaced and aligned radial openings 20 into which extend the end legs of a U-shaped tube, and there is provided in the bore of the nut and extending between the open ends of said tube a spiral groove 22 developed in correspondence with the pitch of the threads on the screw 5. Free rolling balls 23 introduced in sufficient quantity to fill the tube channel 21 and the grooves 22 produce an operative threading connection between the screw 5 and said nut 7. To accommodate the mounting of the tube 21, the cylindrical casing section 9 presents a longitudinal slot 24 which, circumferentially considered, registers with the radial openings 20, and the length of this slot is somewhat greater than the over-all length of the tube, thus to accommodate the endwise movement of the tube as it floats bodily with the nut 7.

In the operation of this high efficiency self-locking screw, and assuming, say, that the same is applied to a jack, it will be apparent that when a relatively small load is applied to the screw 5, the latter tends to move axially and both nuts 6 and 7 shift therewith. Such motion of the nut 6 loads the springs 18 at one end of said nut with the result that the nut 6 has a tendency to resist movement of the screw 5 and increase frictional contact at the point of thread engagement between said nut and screw. The ball bearing nut 7 moves, however, without resistance as the balls 23 work along the track provided therefor. The foregoing motion of the screw and both nuts continues until the ball bearing nut 7 contacts a stop, and depending upon the direction of thrust this will be either the center plate 11 or adjacent cross wall 13. A part of the load having been previously absorbed by the tensioned nut 6, any additional load now applied to the screw 5 will be carried entirely by the ball bearing nut 7 inasmuch as the spring tension upon the nut 6 will perforce become stabilized as the nut 7 bears upon its stop. It will be understood that the division of load between the two nuts 6 and 7 is such that while the ball bearing nut carries the major part of the load, the self-locking feature is available from the tensioned nut 6. The relative portion of the load carried by each nut may be varied by changing the strength of the springs 18 or by so designing the two-part casing as to either increase or decrease the degree to which the ball bearing nut 7 is permitted to travel before the same brings up against its stop.

While there is herein shown and described the preferred embodiment of the invention, it is nevertheless to be understood that minor changes may be made therein without departing from the spirit and scope of the invention as claimed.

I claim:

1. In a self-locking screw, a screw adapted by loading to be subjected to axial thrust, a pair of nuts threaded upon the screw and each arranged for rotation relative to the screw, one of said nuts having a comparatively high coefficient of friction and the other nut having a comparatively low coefficient of friction when subjected to the thrust load of the screw, means permitting both of said nuts to float in an endwise direction through a limited degree of travel and characterized in that the low-friction nut reaches its end limit of travel in advance of the high friction nut, and yielding means associated with the high-friction nut and acting counter to the endwise travel thereof for tensioning the same.

2. The structure of claim 1 in which the yielding means are effective to tension the related nut in either direction of the latter's endwise travel.

3. In a self-locking screw, a casing structure, a screw extending into said casing and adapted by loading to be subjected to axial thrust, a nut threaded upon the screw and having a comparatively high coefficient of friction when subjected to the thrust load of the screw, a second nut threaded upon the screw and having a comparatively low coefficient of friction when subjected to the thrust load of the screw, both of said nuts being splined to the casing and being permitted limited endwise travel in relation thereto with the nut last mentioned reaching its end limit of travel in advance of the first-named nut, and yielding means associated with said first-named nut and acting counter to the endwise travel thereof for tensioning the same.

4. In a self-locking screw, a casing structure, a screw extending into said casing and adapted by loading to be subjected to axial thrust, a nut threaded upon the screw, a second nut threaded upon the screw and, when subjected to the thrust load of the screw, having by comparison a lower coefficient of friction than the first-named nut, both of said nuts being held against rotation but being permitted limited endwise travel in relation to the casing and being characterized in that the nut last mentioned reaches its end limit of travel in advance of the first-named nut, and yielding means associated with said first-named nut and acting counter to the endwise travel thereof for tensioning the same.

5. In a self-locking screw, a screw adapted by loading to be subjected to axial thrust, a nut received upon said screw and having an internal helical groove of the same pitch and direction as the threads of the screw and also providing a by-pass passage extending lengthwise of the nut and communicating at the two ends with the ends of said internal groove, a multiplicity of balls fitting in and substantially filling said internal groove and the by-pass and in their travel along the length of the groove producing a non-fraction bearing between the screw and the nut, a second nut also threaded upon the screw and having, by comparison with the first-named nut, a high coefficient of friction, means holding both of said nuts against rotation with the screw, means permitting both of said nuts to float through a limited degree of endwise travel and characterized in that the first-named nut reaches its end limit of travel in advance of the last-named nut, and yielding means associated with the high-friction nut and acting counter to the endwise travel thereof for tensioning the same.

6. The structure of claim 5 wherein the yielding means is comprised of a plurality of compression springs bearing upon an end wall of the related nut at spaced intervals of the circumference and compressible in a direction endwise to the axis of the screw.

7. The structure of claim 6 in which yielding means are applied to both end walls of the nut to tension the latter in either direction of the latter's endwise floating travel.

8. In a self-locking screw, a casing structure, a screw extending into said casing and adapted to be loaded, a nut threaded upon the screw and having a comparatively high coefficient of friction in its relative turning movement upon the screw, a second nut threaded upon the screw and having a comparatively low coefficient of friction in its relative turning movement upon the screw, the nuts being arranged to move with the screw through a limited degree of floating motion relative to the casing, the casing providing stop means prescribing the end limits of said motion and when engaged by the nuts serving to hold the latter against continued movement with the screw, said stop means being characterized in that the nut last mentioned reaches its end limit of permitted floating motion in advance of the first-named nut, and yielding means associated with said first-named nut and acting counter to the floating travel thereof for tensioning the same to an intensity progressively increasing with the travel.

ROY E. THOMPSON.

REFERENCES CITED

The following references are of record in the file of this patent:

UNITED STATES PATENTS

| Number | Name | Date |
| --- | --- | --- |
| 158,976 | Pfoutz | Jan. 19, 1875 |
| 611,832 | Coughlan | Oct. 4, 1898 |
| 1,847,693 | Kindewater | Mar. 1, 1932 |
| 1,885,970 | Westling | Nov. 1, 1932 |
| 2,098,816 | Walma | Nov. 9, 1937 |
| 2,151,094 | Fiorentino | Mar. 21, 1939 |
| 2,214,493 | Trbojevich | Sept. 10, 1940 |
| 2,298,011 | Hoffer | Oct. 6, 1942 |